July 20, 1948.  B. V. MALMBERG  2,445,402
GEAR MEASURING DEVICE
Filed April 11, 1944  2 Sheets-Sheet 1
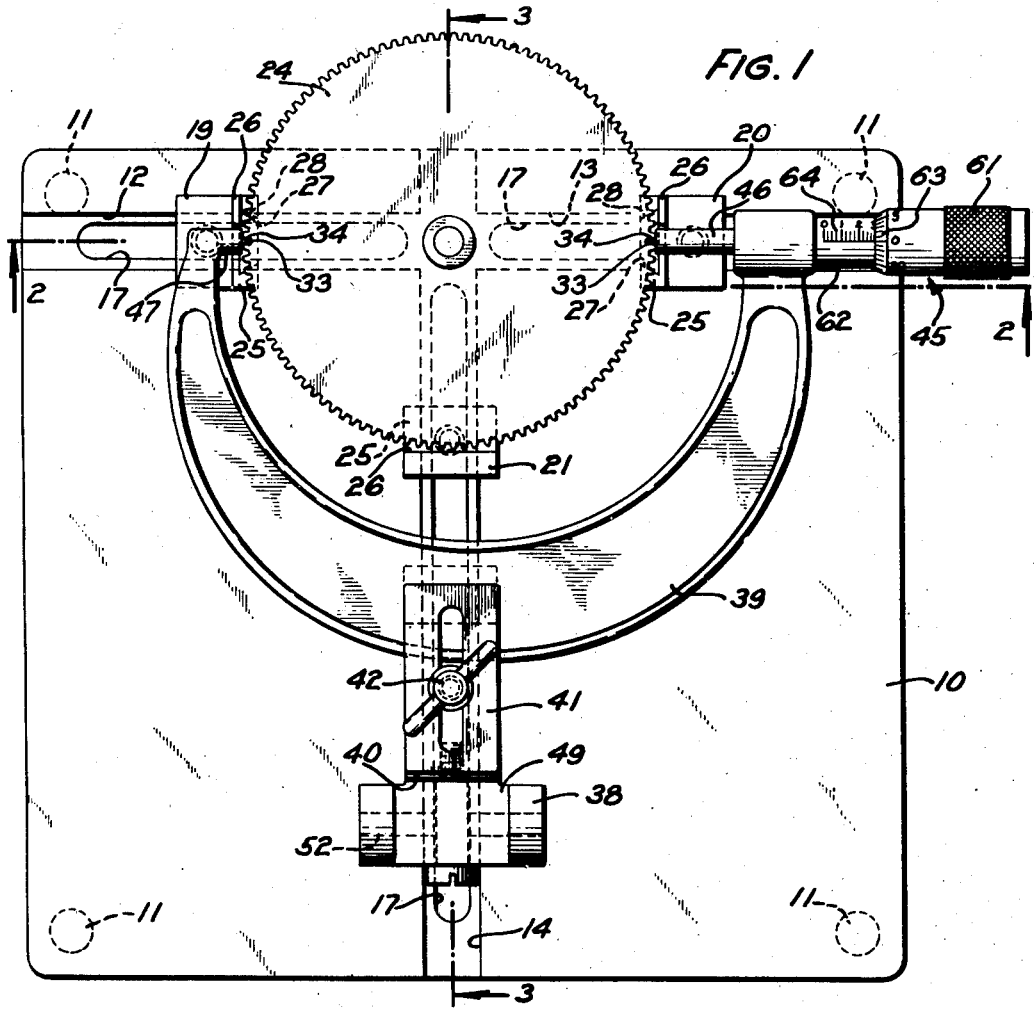
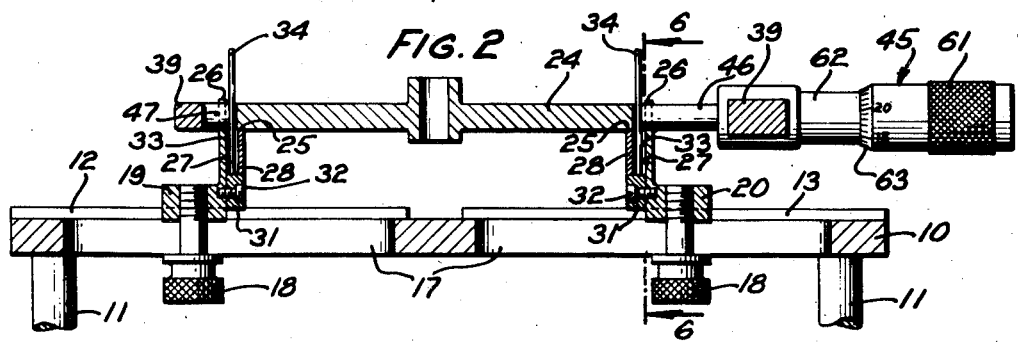
INVENTOR
B. V. MALMBERG
BY
ATTORNEY July 20, 1948. B. V. MALMBERG 2,445,402
GEAR MEASURING DEVICE
Filed April 11, 1944 2 Sheets-Sheet 2
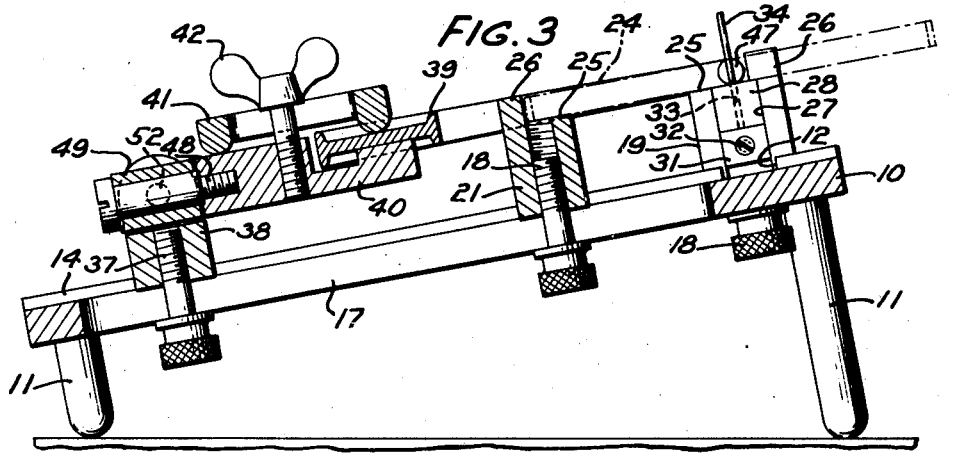
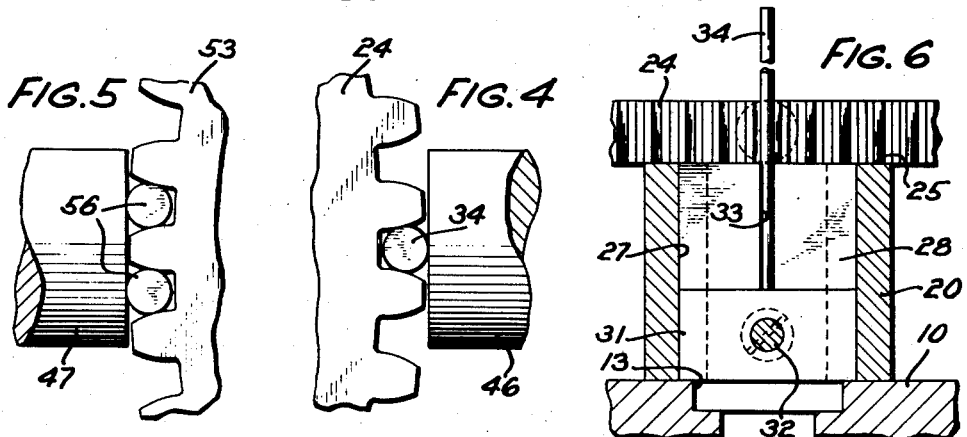
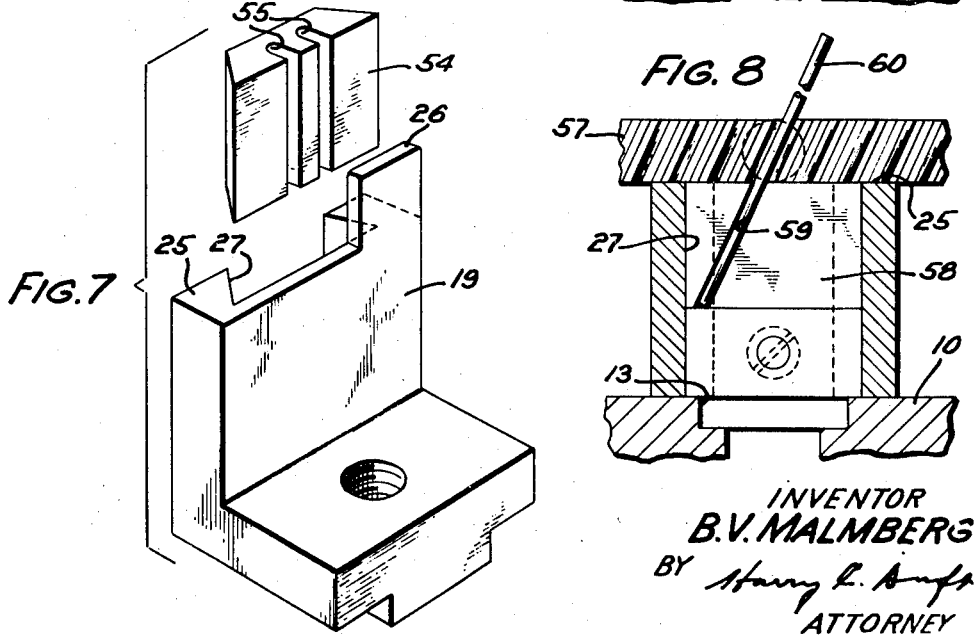
INVENTOR
B. V. MALMBERG
BY
ATTORNEY Patented July 20, 1948

2,445,402

UNITED STATES PATENT OFFICE 2,445,402

GEAR MEASURING DEVICE

Bror V. Malmberg, Chicago, Ill., assignor to Western Electric Company, Incorporated, New York, N. Y., a corporation of New York Application April 11, 1944, Serial No. 530,452

5 Claims. (Cl. 33—179.5)

This invention relates to measuring devices and more particularly to devices for measuring the pitch diameters of gears.

An object of this invention is the provision of a simple and practicable device for efficiently and accurately measuring the pitch diameters of various types of gears.

In accordance with the above object, the present invention, in one embodiment thereof, employing wire gauges and an indicator for measuring the pitch diameter of various types of gears having different diametral pitches, comprises an inclined stand having three horizontal slideways, two of which are in alignment and the third being arranged intermediate and at right angles thereto. Adjustably carried in each of the slideways, for the purpose of accommodating gears of different diameters, are gear supporting members, the two members carried in the aligned slideways each being provided with a vertically extending dovetailed slideway in which may be interchangeably carried different wire gauge supports for gauging gears having different pitch diameters, arrangements and types of teeth. A set of wire gauge supports may be provided for each group of gears within a range of pitch diameters and diametral or tooth pitches. The third gear supporting member is effective as a lateral stop for the gear to insure that the wire gauges are automatically guided into the proper tooth spaces and also to prevent the gear from sliding off the inclined stand.

Other objects and advantages of this invention will more fully appear from the following detailed description, taken in conjunction with the accompanying drawings, wherein Fig. 1 is a plan view of a measuring device embodying the features of this invention, shown applied to a spur gear having an even number of teeth;

Fig. 2 is a vertical irregular section taken on the line 2—2 of Fig. 1;

Fig. 3 is a vertical section taken on the line 3—3 of Fig. 1;

Fig. 4 is an enlarged fragmentary plan view of Fig. 1;

Fig. 5 is a similar view with an arrangement of wire gauges for measuring a spur gear having an odd number of teeth;

Fig. 6 is an enlarged vertical section taken on the line 6—6 of Fig. 2;

Fig. 7 is a perspective view of one of the gear supporting members and an interchangeable wire gauge support for use in measuring a spur gear having an odd number of teeth, and Fig. 8 is an enlarged vertical section similar to Fig. 6 illustrating the use of an interchangeable wire gauge support for application to a helical gear.

Referring to the drawings in detail and particularly to Figs. 1, 2 and 3, 10 indicates a base plate, supported by standards 11, which is inclined towards an operator for convenience in the use of the measuring device. Formed in the base plate 10 are three horizontal slideways 12, 13 and 14, the slideways 12 and 13 being in alignment and the slideways 14 being arranged intermediate and at right angles to the other two slideways. The bottom walls of the slideways are provided with slots 17 extending parallel to the slideways and adapted to freely receive thumb screws 18 for adjustably clamping L-shaped gear supports 19, 20 and 21 in the slideways 12, 13 and 14, respectively, the thumb screws being threaded into apertures formed in the supports. As shown in Figs. 1, 2, 3 and 6, a spur gear, indicated at 24, the pitch diameter of which is to be measured, rests freely upon upper faces 25 of the vertical arms of the three supports 19, 20 and 21. To facilitate the mounting of the gear 24 in correct position, the supports are provided with vertically extendings lugs 26, which lie adjacent the periphery of the gear and thus serve to define the space between the supports 19 and 20 for receiving the gear. The lug 26 on the center support 21 serves as a stop for the gear 24, whereby the gear will be substantially centered between the three supports when mounted on the support faces 25. Also, the gear is prevented from sliding off the inclined supports 19, 20 and 21 by the lug 26 on the support 21. By adjusting the gear supports 19, 20 and 21 along the slots 17, which adjustment is perpendicular to the axis of the gear 24, it will be apparent that the device may be adapted to the measurement of gears of different diameters within the length of the slots.

Each of the L-shaped supports 19 and 20 (Figs. 6 and 7) is provided with a dove-tail vertical slideway 27 in its vertical arm, which extends parallel to the axis of the gear 24, in which is slidably fitted for interchangeability a wire gauge support 28, which rests at its bottom face on an insert 31 secured, as indicated at 32, in the slideway, the upper face of the support being in the plane of the face 25 of the gear support. The sets of wire gauge supports 28, as shown in Figs. 1, 2, 3 and 6, are each formed with a single vertical slot 33 for receiving a wire or pin gauge 34 having a diameter slightly larger than half the circular or tooth pitch, which is the space between two teeth of the gear 24 immediately outside the pitch diameter thereof and the width of the slot 33 is such that the pin loosely fits therein, the depth of the slot being substantially greater than the diameter of the gauge pin to permit the pin to adjust itself therein.

Adjustably secured in the slideway 14, by means of a thumb screw 37, is a main support 38 for a micrometer frame or yoke 39, the yoke being clamped to an irregular shaped member 40 by means of a slotted clamp plate 41 and a thumb screw 42, which is threaded into the member 40. The yoke 39 supports upon one of its arms an indicator or micrometer of a usual type, indicated in general at 45 (Figs. 1 and 2), which is equipped with a reciprocable and rotatable feeler pin 46 and at a diametral point on its opposite arm a fixed anvil pin 47, the pins being arranged to rest at their peripheries upon the support faces 25 and to contact at their outer end faces the pin gauges 34 during the measuring operation. Freely pivoted to the member 40, as indicated at 48 (Fig. 3), is a block 49, which, in turn, is freely pivoted at 52 to the main support 38. It will be seen from this arrangement that the yoke 39, with the oppositely disposed micrometer pins 46 and 47, is thus rockable about the two pivots 48 and 52, which are arranged at right angles to each other and, consequently, the micrometer pins will readily position themselves for contacting the support faces 25 and the pin gauges 34.

The adjustability of the main yoke support 38 in the slidaway 14 makes it possible to mount different size yokes to accommodate gears of variour diameters. It is to be understood that the gear supports 19, 20 and 21 will also be adjusted in their respective slideways 12, 13 and 14 when a different size yoke is used.

In case it is desired to measure the pitch diameter of a spur gear 53 (Fig. 5), similar to the gear 24, but having an odd number of teeth, the right hand single slotted gauge support 28 (Fig. 1) carrying the pin gauge 34 is left in position and the left hand support 28 is removed by sliding it vertically out of the gear support slideway 27 and in its stead is inserted a wire gauge support 54 (Fig. 7) having two vertical slots 55 for receiving two pin gauges 56 (Fig. 5) similar to the pin gauge 34. To measure the pitch diameter of a helical gear 57 (Fig. 8), gauge supports 58 having a slot 59 or slots, as the case may be, formed at an angle similar to the angle of the gear teeth are mounted in the slideways 27 of the gear support and in which slots are loosely mounted a pin gauge 60 or pin gauges, similar to the pin gauge 34.

Different sets of pin gauges of various diameters with supports therefor having corresponding slots for receiving the pin gauges may be provided for use in measuring the pitch diameters of gears having a wide range of diametrical or tooth pitches.

The measuring device, as shown in Figs. 1, 2, 3 and 4, is set up for measuring the pitch diameter of a spur gear having an even number of teeth and, therefore, a single gauge pin 34 is carried in each of the oppositely arranged supports 28. It will be understood that a set of gauge pins 34, with their supports 28, have been selected for the particular diametral or tooth pitch of the gear.

A rotatable thimble or hand grip 61 and a stationary barrel 62 of the micrometer 45 are provided with suitable sets of graduations 63 and 64, respectively. The operator, knowing what the micrometer reading should be for the particular type of gear being measured and with the movable feeler pin 46 in its retracted position, places the gear 24 on the support faces 25 of the device and due to the arrangement of the supports 19, 20 and 21 and the lugs 26 thereof, the gear will be centered and the gauge pins 34 automatically guided into the proper tooth spaces. Thereafter, the micrometer hand grip 61 is rotated until the outer end faces of the feeler pin 46 and anvil pin 47 engage the gauge pins 35 with a desired pressure and the measured pitch diameter of the gear is read from the cooperating micrometer graduations 63 and 64.

What is claimed is:

1. A device for measuring the pitch diameter of toothed gears comprising a base for predeterminedly positioning and supporting a gear, slides at diametrical points of said gear mounted in slideways in said base extending parallel to the plane of said gear, gauge pins extending parallel to the teeth of the gear carried by said slides for predeterminedly engaging in tooth spaces of said gear at said points, and parallel aligned means operatively engageable with said gauge pins for measuring the pitch diameter of the gear.

2. A device for measuring the pitch diameter of toothed gears comprising a base, adjustable slides for predeterminedly positioning and supporting a gear, said slides being mounted in slideways in said base extending perpendicular to the axis of said gear, two of said slides being arranged at diametral points of said gear and a third slide at a point intermediate said two slides, other slides mounted in slideways in said two slides extending parallel to the axis of said gear, gauge pins carried by said other slides for predeterminedly engaging in tooth spaces of said gear at said two points and means operatively engageable with said gauge pins for measuring the pitch diameter of the gear.

3. A device for measuring the pitch diameter of gears comprising a three-point support for a gear to be measured, two of said points being diametrically opposite, a measuring means resting on said two diametrically opposite points of said support, a universal support for said measuring means, and means for loosely supporting gauge pins at said diametrically opposite support points for engagement by said measuring means to measure the pitch diameter of the gear.

4. A device for measuring the pitch diameter of toothed gears comprising a base, gear supporting means adjustable on said base at three points for predeterminedly positioning and supporting gears of different diameters, two of said supporting means being diametrically opposite, an interchangeable mounting for a gauge pin carried by each of said two supporting means, a gauge pin carried by each of said mountings for predeterminedly engaging in tooth spaces of said gear, and means operatively engageable with said gauge pins for measuring the pitch diameter of the gear.

5. A device for measuring the pitch diameter of toothed gears comprising a base, gear supporting means adjustable on said base at three points for predeterminedly positioning and supporting gears of different diameters, two of said supporting means being diametrically opposite and a third supporting means intermediate said two supporting means, an interchangeable mounting for a gauge pin carried by each of said two supporting means, a gauge pin loosely carried by each of said mountings for predeterminedly engaging in tooth spaces of said gear, a measuring means resting on said two gear supporting means for engaging said gauge pins to measure the pitch diameter of the gear, and a universal mounting for said measuring means adjustable on said base and in alignment with said third gear supporting means for supporting different sizes of measuring means.

BROR V. MALMBERG.

REFERENCES CITED

The following references are of record in the file of this patent:

UNITED STATES PATENTS

| Number | Name | Date |
|---|---|---|
| 1,541,796 | Darlington | June 16, 1925 |
| 2,014,668 | Rinderknecht | Sept. 17, 1935 |
| 2,318,970 | Richmond | May 11, 1943 |

FOREIGN PATENTS

| Number | Country | Date |
|---|---|---|
| 483,677 | France | 1917 |

OTHER REFERENCES

Gages, Gaging and Inspection of 1918, pages 222–226.

Publication: Amer. Machinist, September 16, 1943, page 107.